US012802253B2

(12) United States Patent
Sugiyama et al.

(10) Patent No.: US 12,802,253 B2
(45) Date of Patent: Nov. 17, 2026

(54) POLLUTION LEVEL ESTIMATION SYSTEM, POLLUTION LEVEL ESTIMATION METHOD, AND POLLUTION LEVEL ESTIMATION PROGRAM

(71) Applicant: Japan Agency for Marine-Earth Science and Technology, Kanagawa (JP)

(72) Inventors: Daisuke Sugiyama, Yokosuka (JP); Mitsuko Hidaka, Yokosuka (JP); Daisuke Matsuoka, Yokosuka (JP); Fumiaki Araki, Yokosuka (JP)

(73) Assignee: Japan Agency for Marine-Earth Science and Technology, Kanagawa (JP)

( * ) Notice: Subject to any disclaimer, the term of this patent is extended or adjusted under 35 U.S.C. 154(b) by 265 days.

(21) Appl. No.: 18/577,837

(22) PCT Filed: May 30, 2022

(86) PCT No.: PCT/JP2022/021978
§ 371 (c)(1),
(2) Date: Jan. 9, 2024

(87) PCT Pub. No.: WO2023/002755
PCT Pub. Date: Jan. 26, 2023

(65) Prior Publication Data

US 2024/0320848 A1 Sep. 26, 2024

(30) Foreign Application Priority Data

Jul. 20, 2021 (JP) ................................ 2021-119698

(51) Int. Cl.
*G06T 7/62* (2017.01)
*G06Q 50/26* (2012.01)
(Continued)

(52) U.S. Cl.
CPC ............... *G06T 7/62* (2017.01); *G06Q 50/26* (2013.01); *G06T 7/11* (2017.01); *G06V 20/38* (2022.01);
(Continued)

(58) Field of Classification Search
CPC .............. G06T 7/62; G06T 7/11; G06V 20/38
See application file for complete search history.

(56) References Cited

FOREIGN PATENT DOCUMENTS

AU 2020228229 B2 * 6/2023 ............. G06T 11/10
CN 111767822 A * 10/2020 ............. G06V 20/38
(Continued)

OTHER PUBLICATIONS

Coastal Waste Detection (Year: 2021).*
(Continued)

*Primary Examiner* — Ted W Barnes
(74) *Attorney, Agent, or Firm* — Studebaker Brackett PLLC

(57) ABSTRACT

A pollution level estimation system is a system that estimates a pollution level at a location to be estimated, the system including an image acquisition unit that acquires an image of the location to be estimated, a detection unit that detects a garbage portion showing garbage and a non-garbage portion not showing garbage at the location to be estimated in the acquired image, and a pollution level estimation unit that calculates areas of the detected garbage portion and non-garbage portion and estimates a pollution level at the location to be estimated on the basis of the calculated area.

6 Claims, 4 Drawing Sheets

(51) Int. Cl.

| | |
|---|---|
| ***G06T 7/11*** | (2017.01) |
| ***G06V 20/00*** | (2022.01) |

(52) U.S. Cl.

CPC ............... *G06T 2207/20081* (2013.01); *G06T 2207/30181* (2013.01); *G06V 2201/07* (2022.01)

(56) References Cited

FOREIGN PATENT DOCUMENTS

| | | | | | |
|---|---|---|---|---|---|
| CN | 113761098 | A | * | 12/2021 | ............. G06T 11/26 |
| CN | 114565635 | B | * | 11/2022 | ............. G06F 18/22 |
| CN | 119048462 | A | * | 11/2024 | ........... G06N 3/0464 |
| FR | 3050300 | A1 | * | 10/2017 | ............. G06V 20/13 |
| JP | 06027014 | A | * | 2/1994 | |
| JP | H06-027014 | A | | 2/1994 | |
| JP | 2000-353014 | A | | 12/2000 | |
| JP | 2003143962 | A | * | 5/2003 | |
| JP | 2020064564 | A | * | 4/2020 | |
| JP | 2020139730 | A | * | 9/2020 | ............. G06T 11/10 |
| JP | 7075557 | B1 | * | 5/2022 | ......... G01L 19/0007 |

OTHER PUBLICATIONS

Coastal Waste Detection based on deep convolutional neural networks (Year: 2021).*

International Search Report issued in PCT/JP2022/021978; mailed Aug. 9, 2022.

Notification of Transmittal of Translation of the International Preliminary Report on Patentability and Translation of Written Opinion of the International Searching Authority; PCT/JP2022/021978; mailed on Feb. 1, 2024.

* cited by examiner

POLLUTION LEVEL ESTIMATION SYSTEM, POLLUTION LEVEL ESTIMATION METHOD, AND POLLUTION LEVEL ESTIMATION PROGRAM

TECHNICAL FIELD

The present invention relates to a pollution level estimation system, a pollution level estimation method, and a pollution level estimation program for estimating a pollution level at a location to be estimated such as the seashore.

BACKGROUND ART

Deterioration in coastal landscapes has a negative influence on tourism and influences the ecosystems of both marine and terrestrial organisms. For this reason, local governments are cleaning up garbage on the seashore, requesting outside organizations to do the cleanup work, and the like. On the other hand, investigations are also conducted several times a year to ascertain the pollution level on the seashore at the present time. The investigation is conducted, for example, on the basis of Japan's Ministry of the Environment's guidelines in which an image of the seashore is captured by a camera, and an investigator refers to the image to determine the pollution level on an 11-point scale. In addition, Patent Literature 1 discloses that an investigator investigates drifting garbage on the seashore.

CITATION LIST

Patent Literature

[Patent Literature 1] Japanese Unexamined Patent Publication No. 2003-143962

SUMMARY OF INVENTION

Technical Problem

The method of determining a pollution level on the basis of an image described above was based on the subjectivity of the investigator, and thus did not necessarily provide an accurate evaluation. In addition, since a method disclosed in Patent Literature 1 is also an investigation based on an investigator's visual observation, there is concern that the evaluation will not be accurate.

An embodiment of the present invention was contrived in view of the above point, and an object thereof is to provide a pollution level estimation system, a pollution level estimation method, and a pollution level estimation program that make it possible to more accurately estimate a pollution level at a location to be estimated.

Solution to Problem

In order to achieve the above object, according to an embodiment of the present invention, there is provided a pollution level estimation system configured to estimate a pollution level at a location to be estimated, the system including: image acquisition means configured to acquire an image of the location to be estimated; detection means configured to detect a garbage portion showing garbage and a non-garbage portion not showing garbage at the location to be estimated in the image acquired by the image acquisition means; and pollution level estimation means configured to calculate areas of the garbage portion and non-garbage portion detected by the detection means and estimate a pollution level at the location to be estimated on the basis of the calculated areas.

In the pollution level estimation system according to an embodiment of the present invention, the pollution level at the location to be estimated is estimated on the basis of the areas of the garbage portion and non-garbage portion detected from an image. This makes it possible to estimate a pollution level without depending on an investigator's subjectivity or the like. Therefore, with the pollution level estimation system according to an embodiment of the present invention, it is possible to more accurately estimate a pollution level at a location to be estimated.

The pollution level estimation means may acquire information indicating a distance from an imaging point to each of the garbage portion and non-garbage portion with respect to each of the garbage portion and non-garbage portion in the image and calculate the areas of the garbage portion and non-garbage portion weighted by the respective distances. According to such a configuration, the areas of the garbage portion and non-garbage portion used to estimate a pollution level can be calculated taking into account the above distances. As a result, it is possible to more accurately estimate a pollution level at a location to be estimated.

The pollution level estimation means may calculate the distance from the image acquired by the image acquisition means. According to such a configuration, an area weighted by distance can be calculated from the image alone. As a result, the pollution level at a location to be estimated can be estimated simply and accurately.

The pollution level estimation means may calculate the number of pieces of garbage shown at the location to be estimated in the image and estimates a pollution level at the location to be estimated also on the basis of the calculated number of pieces of garbage. According to such a configuration, it is possible to more accurately estimate a pollution level at a location to be estimated.

The detection means may detect the garbage portion, the non-garbage portion, and portions other than the location to be estimated through segmentation using machine learning. According to such a configuration, it is possible to reliably and appropriately estimate a pollution level at a location to be estimated.

Incidentally, an embodiment of the present invention can be described as a pollution level estimation system as described above, and can also be described as an invention of a pollution level estimation method and a pollution level estimation program as follows. These are substantially the same inventions differing only in category, and have the same operations and effects.

That is, according to an embodiment of the present invention, there is provided a pollution level estimation method which is a method of operating a pollution level estimation system that estimates a pollution level at a location to be estimated, the method including: an image acquisition step of acquiring an image of the location to be estimated; a detection step of detecting a garbage portion showing garbage and a non-garbage portion not showing garbage at the location to be estimated in the image acquired in the image acquisition step; and a pollution level estimation step of calculating areas of the garbage portion and non-garbage portion detected in the detection step and estimating a pollution level at the location to be estimated on the basis of the calculated areas.

According to an embodiment of the present invention, there is provided a pollution level estimation program that causes a computer to operate as a pollution level estimation system that estimates a pollution level at a location to be estimated, the program causing the computer to function as: image acquisition means configured to acquire an image of the location to be estimated; detection means configured to detect a garbage portion showing garbage and a non-garbage portion not showing garbage at the location to be estimated in the image acquired by the image acquisition means; and pollution level estimation means configured to calculate areas of the garbage portion and non-garbage portion detected by the detection means and estimate a pollution level at the location to be estimated on the basis of the calculated areas.

Advantageous Effects of Invention

According to an embodiment of the present invention, it is possible to more accurately estimate a pollution level at a location to be estimated.

DESCRIPTION OF EMBODIMENTS

Figure 1:
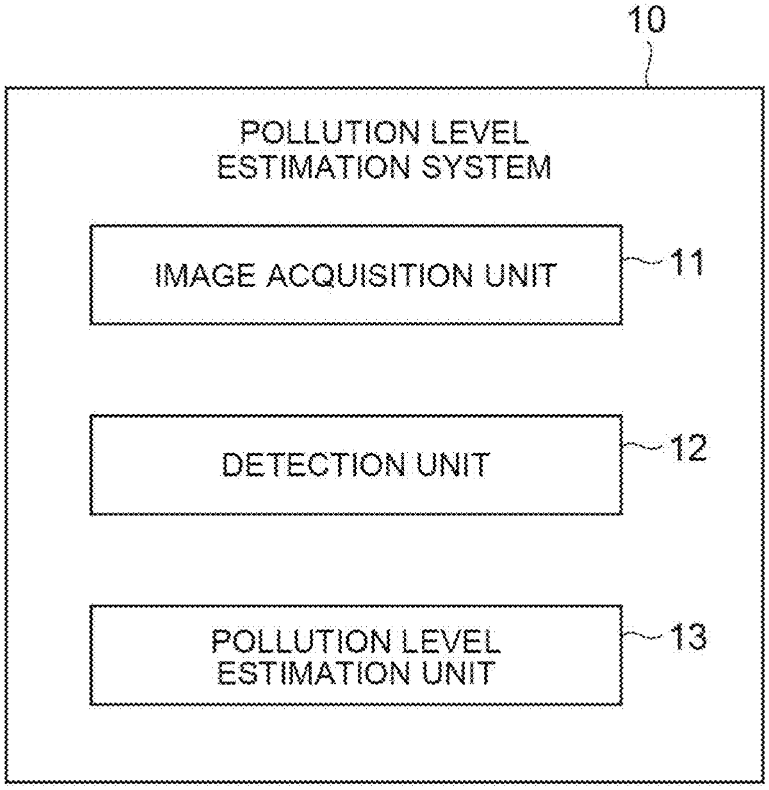
FIG. 1 is a diagram illustrating a configuration of a pollution level estimation system according to an embodiment of the present invention.

Hereinafter, an embodiment of a pollution level estimation system, a pollution level estimation method, and a pollution level estimation program according to the present invention will be described in detail with reference to the accompanying drawings. Meanwhile, in the description of the drawings, the same components are denoted by the same reference numerals and signs, and thus description thereof will not be repeated.

FIG. 1 shows a pollution level estimation system 10 according to the present embodiment. The pollution level estimation system 10 is a system (device) that estimates a pollution level at a location to be estimated. The pollution level in the present embodiment is a degree indicating how much a location to be estimated is polluted with garbage. The pollution level may be estimated, for example, on a plurality of levels (for example, five levels).

The location to be estimated (region) in the present embodiment is, for example, a seashore. However, the location to be estimated may be any location other than a seashore insofar as it is a location at which the above pollution level can be estimated. For example, the location to be estimated may be a river or an urban block. In the present embodiment, a case where the location to be estimated is a seashore will be described as an example. In a case where the location to be estimated is the seashore, garbage related to the pollution level is, for example, drifting garbage. However, garbage other than drifting garbage may be considered as garbage related to the pollution level depending on the location to be estimated. The estimated pollution level is used for mechanical and quantitative monitoring of the location to be estimated, and more specifically, for example, used to determine the necessity of cleaning the seashore.

The pollution level estimation system 10 is specifically constituted by a server device which is a computer including hardware such as a central processing unit (CPU) and a memory, and the like. Each function of the pollution level estimation system 10 which will be described later is achieved by these components operating by means of a program or the like. Meanwhile, the pollution level estimation system 10 may be realized by one computer, or may be realized by a computer system configured with a plurality of computers connected to each other through a network.

Subsequently, the functions of the pollution level estimation system 10 according to the present embodiment will be described. As shown in FIG. 1, the pollution level estimation system 10 is configured to include an image acquisition unit 11, a detection unit 12, and a pollution level estimation unit 13.

The image acquisition unit 11 is image acquisition means that acquires an image of the location to be estimated. The image is generated, for example, by a user who is an investigator performing image capturing (photographing) with a camera at the location to be estimated so that the location to be estimated appears in the image. The image acquisition unit 11 receives an image transmitted from the camera to acquire the image. The image acquisition unit 11 outputs the acquired image to the detection unit 12 and the pollution level estimation unit 13. The image acquisition unit 11 may standardize the acquired image to a size set in advance by resizing or the like for processing in the detection unit 12 and the pollution level estimation unit 13. The standardization may be performed using existing techniques.

The image capturing and image transmission may be performed using a smartphone used by the user with a dedicated application for estimating the pollution level (hereinafter referred to as a smartphone application). Meanwhile, the camera does not need to be included in the smartphone, and may be a consumer camera or an imaging device such as a fixed-point camera provided so that an image of the location to be estimated is captured. In addition, the image acquisition unit 11 may acquire the image using methods other than those described above.

The detection unit 12 is detection means that detects a garbage portion showing garbage (pollution target region) and a non-garbage portion not showing garbage (non-pollution region) at the location to be estimated in the image acquired by the image acquisition unit 11. The detection unit 12 may detect the garbage portion, the non-garbage portion, and portions other than the location to be estimated through segmentation using machine learning. That is, the detection unit 12 may perform the above detection using artificial intelligence. The detection unit 12 performs, for example, the detection as follows.

The detection unit 12 inputs the image from the image acquisition unit 11, and performs the above detection using a learned model stored in advance. The learned model is for segmentation (for example, semantic segmentation) generated through machine learning. The learned model is configured to include a neural network. The neural network may be multi-layered. That is, the neural network may be generated through deep learning. For example, the neural network is an HRNet.

The learned model inputs an image and outputs information indicating the classification of each pixel in the input image. The classification is an indication of what is reflected in the portion of the pixel. Any classification may be used insofar as it can distinguish between the garbage portion, the non-garbage portion, and portions other than the location to be estimated. For example, there are eight classifications: artificial drifting garbage (artificial drifting objects), natural drifting garbage (natural drifting objects), sky, sea, sandy beaches, existing natural objects (natural objects), existing artificial objects (installed objects), and other backgrounds. Among the above classifications, artificial drifting garbage and natural drifting garbage are equivalent to the garbage portion. Among the above classifications, sandy beaches, existing natural objects, and existing artificial objects are equivalent to the non-garbage portion. Among the above classifications, sky, sea, and other backgrounds are equivalent to the portions other than the location to be estimated.

The learned model may be generated using existing machine learning methods. For example, a large number of (for example, approximately 3500) seashore images showing drifting garbage are prepared as images for learning. The image for learning may be an image that has been standardized described above. In addition, data (pixel unit region data) indicating which region of the above classifications each pixel of the image for learning is included in is generated in advance as data for learning. A learned model is generated by performing machine learning using a dataset composed of a pair of images for learning and data for learning.

Figure 2:
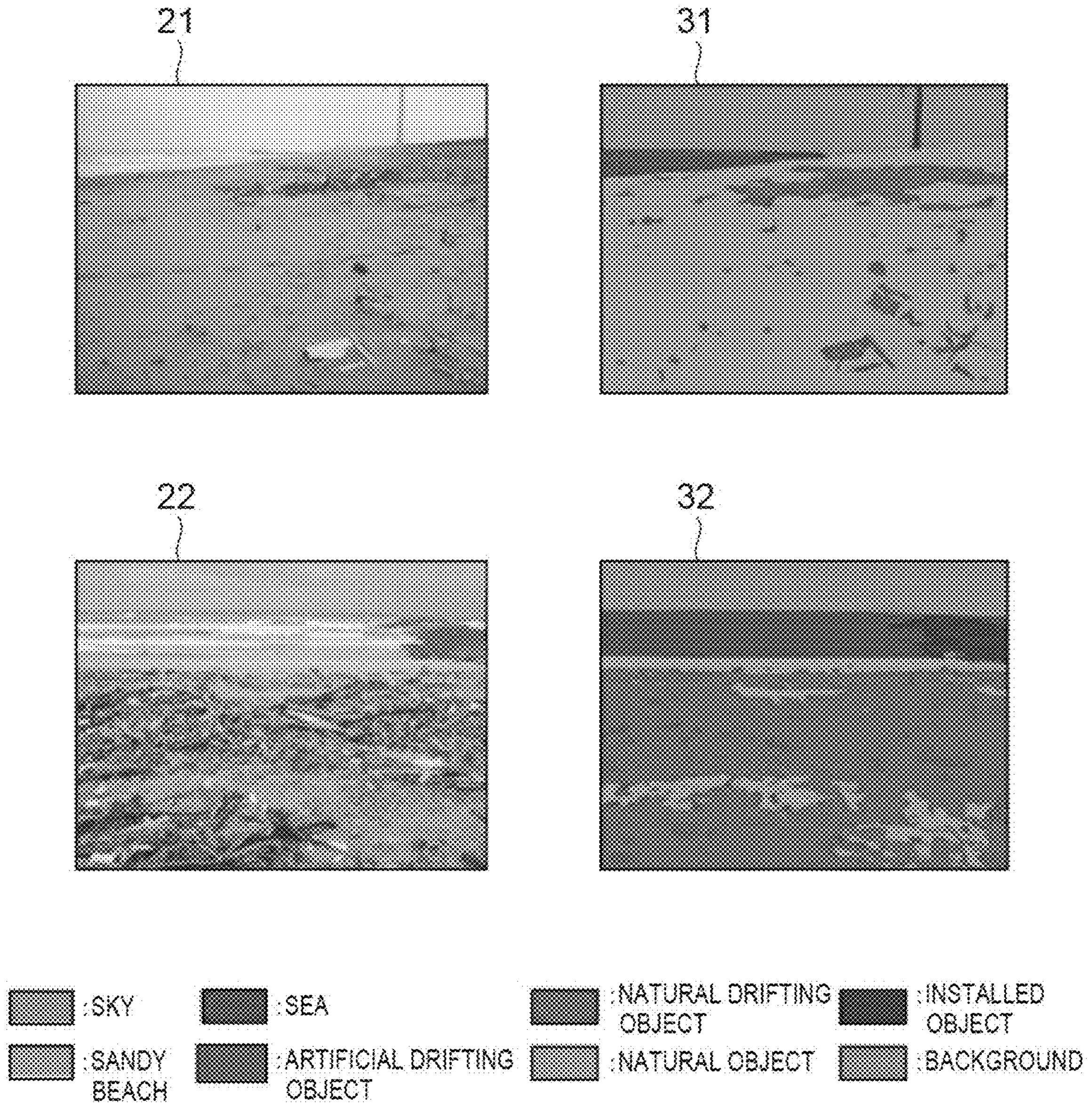
FIG. 2 is an example of images used to estimate pollution levels and detection results for the images.

The detection unit 12 inputs the image input from the image acquisition unit 11 to the learned model, and obtains an output from the learned model. The output from the learned model is the detection result of the garbage portion and non-garbage portion in the image. FIG. 2 shows two examples of images input from the image acquisition unit 11 and results of detection performed by the detection unit 12. In the example shown in FIG. 2, a detection result 31 is obtained from an image 21, and a detection result 32 is obtained from an image 22. Meanwhile, the legend in FIG. 2 is for the detection results 31 and 32. The detection unit 12 outputs the obtained detection results to the pollution level estimation unit 13. Meanwhile, the detection unit 12 may detect the garbage portion and non-garbage portion in the image using a method other than the above (for example, an algorithm stored in advance).

The pollution level estimation unit 13 is pollution level estimation means that calculates the areas of the garbage portion and non-garbage portion detected by the detection unit 12 and estimates the pollution level at the location to be estimated on the basis of the calculated areas. The pollution level estimation unit 13 may acquire information indicating a distance from an imaging point to each of the garbage portion and non-garbage portion with respect to each of the garbage portion and non-garbage portion in the image and calculate the areas of the garbage portion and non-garbage portion weighted by the respective distances. The pollution level estimation unit 13 may calculate the distance from the image acquired by the image acquisition unit 11. The pollution level estimation unit 13 estimates the pollution level, for example, as follows.

The pollution level estimation unit 13 inputs the image from the image acquisition unit 11. The pollution level estimation unit 13 inputs the detection result from the detection unit 12. The pollution level estimation unit 13 calculates the distance, that is, depth, from the imaging point (the position of the imaging device at the time of imaging) to the portion reflected in the pixel for each pixel of the image input from the image acquisition unit 11. Meanwhile, the calculated depth does not need to be a value indicating the distance itself, and need only be a value corresponding to the distance. The depth need only be calculated for pixels equivalent to at least the garbage portion (in the above-described example, the portion of artificial drifting garbage and natural drifting garbage) and the non-garbage portion (in the above-described example, the portion of sandy beaches, existing natural objects, and existing artificial objects) in the image. The detection result from the detection unit 12 may be used to calculate the depth. The depth may be calculated using existing methods. The depth may be calculated through an approximate calculation using an approximate formula.

The detection unit 12 calculates the depth, for example, as follows. The detection unit 12 first determines the horizontal line in the image. The horizontal line may be determined using existing methods. For example, the horizontal line is determined by calculating the amount of change in the up-down (vertical direction) average value of the horizontal axis (horizontal direction) at the boundary between the sea and the sky or other backgrounds from the result of detection performed by the detection unit 12, based on the calculated amount of change. Alternatively, a guideline set in advance in a smartphone application may be determined as the horizontal line. Subsequently, the detection unit 12 calculates the depth of each pixel through geometric calculation on the basis of the determined horizontal line.

The pollution level estimation unit 13 may acquire information indicating the depth of each pixel in the image using methods other than those described above. For example, with the camera that captures an image as a camera having a depth sensor, and with the image acquired by the image acquisition unit 11 associated with information indicating the depth of each pixel, the pollution level estimation unit 13 may acquire the information.

Subsequently, the pollution level estimation unit 13 calculates the area weighted by depth with respect to each of the garbage portion and non-garbage portion detected by the detection unit 12. For example, the pollution level estimation unit 13 calculates the sum of the depth values for each portion as an area weighted by the depth of the portion. That is, the pollution level estimation unit 13 calculates the sum of the depth values for each pixel identified as either artificial drifting garbage or natural drifting garbage as the weighted area of the garbage portion. In addition, the pollution level estimation unit 13 calculates the sum of the depth value for each pixel identified as either sandy beaches, existing natural objects, or existing artificial objects as the weighted area of the non-garbage portion.

The pollution level estimation unit 13 estimates the pollution level at the location to be estimated on the basis of each calculated area. For example, the pollution level estimation unit 13 calculates the value of the ratio between the weighted area of the garbage portion and the weighted area of the non-garbage portion. The pollution level estimation unit 13 calculates, for example, the ratio value (weighted area of the garbage portion)/(weighted area of the non-garbage portion) as the covered area ratio of the drifting garbage. As the value of this ratio becomes larger, the pollution level increases. The pollution level estimation unit 13 stores in advance the correspondence relation between the value of the ratio and a plurality of levels indicating the pollution level, and the pollution level estimation unit 13 estimates the pollution level from the value of the ratio on the basis of the stored correspondence relation. The above correspondence relation may be a calculation formula, conditional branch information, or the like for calculating the pollution level from the value of the ratio. Alternatively, the pollution level estimation unit 13 may use the calculated ratio value itself as the pollution level to be estimated.

The area of each of the garbage portion and non-garbage portion does not need to be weighted by depth. For example, the number of pixels of each of the garbage portion and non-garbage portion may be used as the area of each of the garbage portion and non-garbage portion.

In addition, the pollution level estimation unit 13 may calculate the number of pieces of garbage shown at the location to be estimated in the image, and estimate the pollution level at the location to be estimated also on the basis of the calculated number of pieces of garbage. In this case, the pollution level estimation unit 13 calculates the number of pieces of garbage in the image from the image input from the image acquisition unit 11. The garbage of which the number is to be calculated is the drifting garbage described above. The number of pieces of garbage may be calculated using an existing method, for example, a technique of detecting an object from an image. In addition, the detection of the number of pieces of garbage may be performed together with the detection of the garbage portion performed by the detection unit 12 described above (in that case, the detection unit 12 is assumed to have some of the functions of the pollution level estimation means).

The pollution level estimation unit 13 estimates the pollution level on the basis of the above area (or value of a ratio or the like based on the area) and the calculated number of pieces of garbage. For example, the pollution level estimation unit 13 stores in advance a calculation formula that inputs the values of the above areas and the number of pieces of garbage, and that outputs the estimation result of the pollution level, and estimates the pollution level using the calculation formula.

The above calculation formula (including the case where the number of pieces of garbage is not used) may be a learned model generated through machine learning. That is, the pollution level estimation unit 13 may estimate the pollution level using artificial intelligence. The learned model may include a neural network. When the learned model for estimating the pollution level is used, data for learning corresponding to an input (for example, value based on the above areas and value of the number of pieces of garbage) and an output (information indicating the pollution level) of the learned model is prepared in advance and machine learning is performed to generate the learned model. As the data for learning corresponding to the output, information indicating the pollution level estimated in advance by a method other than the pollution level estimation system 10 is used. Meanwhile, the pollution level estimation unit 13 may estimate the pollution level at the location to be estimated on the basis of the areas of the garbage portion and non-garbage portion using a method other than the above (for example, an algorithm stored in advance).

In addition, the pollution level estimation unit 13 may estimate the pollution level of the location to be estimated from each of a plurality of images, and estimate the pollution level of the location to be estimated from the plurality of estimation results. For example, the pollution level estimation unit 13 may estimate the pollution level from each of a plurality of images for the same seashore, and may estimate the pollution level of the seashore from the plurality of estimation results. In that case, the image acquired by the image acquisition unit 11 may be associated with information indicating the location to be estimated, for example, information such as an ID for specifying the seashore, and used for the above process. The pollution level of the location to be estimated may be estimated using any method from the plurality of estimation results. For example, the plurality of estimation results may be averaged.

The pollution level estimation unit 13 outputs information indicating the pollution level at the location to be estimated which is the estimation result. For example, the pollution level estimation unit 13 transmits the estimation result to the smartphone which is a transmission source of the image used to estimating the pollution level. This transmission may be performed through a smartphone application. In addition, the pollution level estimation unit 13 may transmit the results of detection performed by the detection unit 12, for example, information on the format of the images such as the detection results 31 and 32 shown in FIG. 2. The user can ascertain the pollution level at the location to be estimated by referring to the transmitted information.

In addition, the pollution level estimation unit 13 may output the estimation result and the image (base image) acquired by the image acquisition unit 11 and used for estimation to a database that can be accessed through a communication network such as the Internet. The estimation results may be referenced for each location to be estimated, that is, each piece of seashore. In addition, the pollution level estimation unit 13 may perform an output to an output destination using a method other than the above. The above are the functions of the pollution level estimation system 10 according to the present embodiment.

Figure 3:
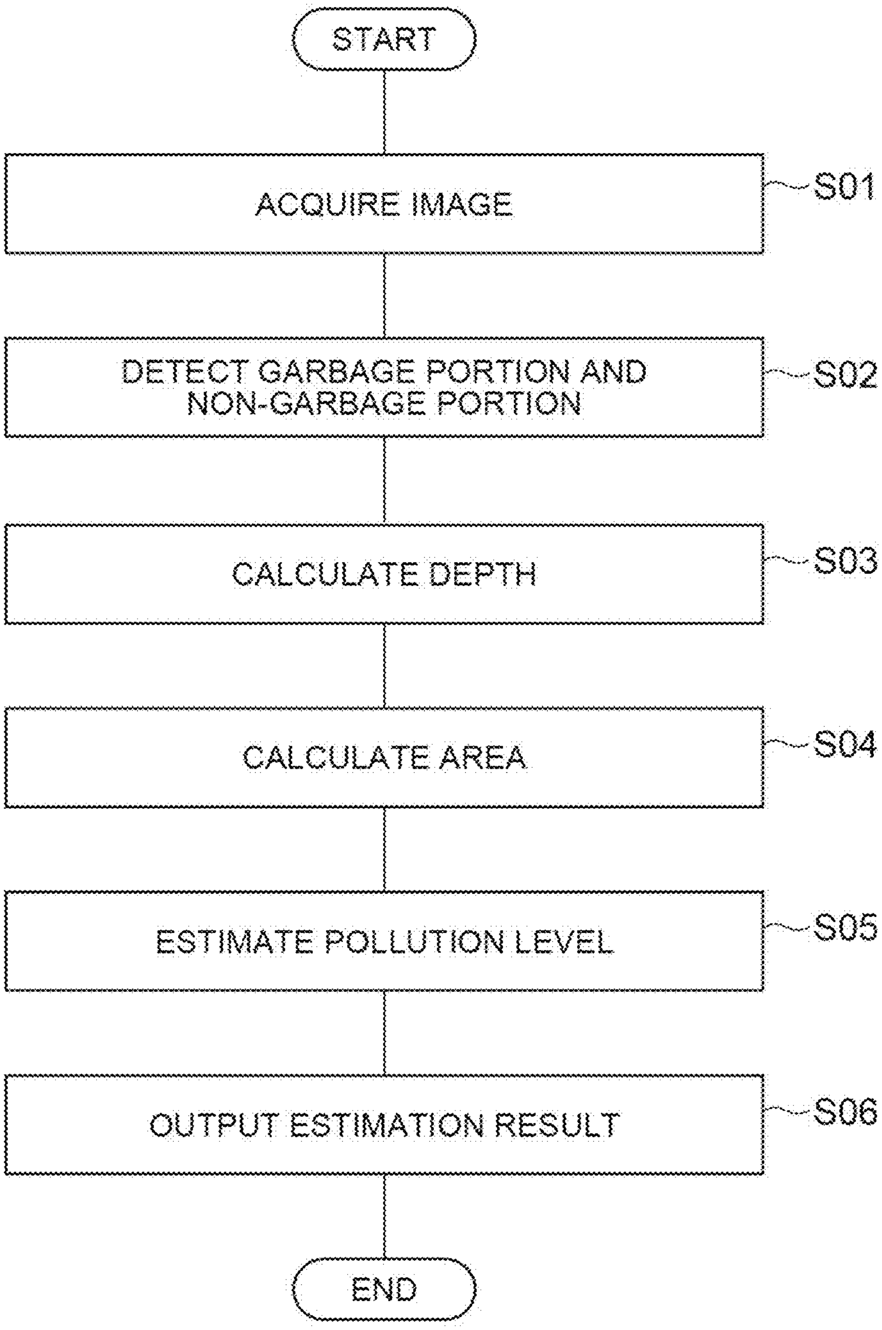
FIG. 3 is a flowchart illustrating a pollution level estimation method which is a process executed by the pollution level estimation system according to the embodiment of the present invention.

Subsequently, a pollution level estimation method which is a process executed by the pollution level estimation system 10 (operation method performed by the pollution level estimation system 10) according to the present embodiment will be described with reference to the flowchart of FIG. 3.

In the present processing, the image acquisition unit 11 acquires an image of the location to be estimated (S01, image acquisition step). Subsequently, the detection unit 12 detects the garbage portion and non-garbage portion in the image (S02, detection step). Subsequently, the pollution level estimation unit 13 calculates the depth of each of garbage portion and non-garbage portion in the image (S03, pollution level estimation step).

Next, the pollution level estimation unit 13 calculates the areas of the garbage portion and non-garbage portion weighted by depths (S04, pollution level estimation step). Next, the pollution level estimation unit 13 estimates the pollution level at the location to be estimated on the basis of the areas (S05, pollution level estimation step). Next, the pollution level estimation unit 13 outputs the estimation result of the pollution level at the location to be estimated (S06). The above is the process executed by the pollution level estimation system 10 according to the present embodiment.

In the present embodiment, the pollution level at the location to be estimated is estimated on the basis of the areas of the garbage portion and non-garbage portion detected from the image. This makes it possible to estimate a pollution level without depending on an investigator's subjectivity or the like. That is, the pollution level can be quantitatively and automatically estimated on the basis of a uniform standard rather than being determined on the basis of the investigator's empirical rules and the like. Therefore, according to the present embodiment, it is possible to more accurately estimate a pollution level at a location to be estimated.

In addition, as in the above-described embodiment, the areas weighted using depths may be calculated and used to estimate the pollution level. According to such a configuration, the areas of the garbage portion and non-garbage portion used to estimate the pollution level can be calculated taking into account the depths. As a result, it is possible to more accurately estimate a pollution level at a location to be estimated.

In addition, as in the above-described embodiment, the depth may be calculated from the image used to estimate the pollution level. According to such a configuration, a weighted area can be calculated from the image alone. As a result, the pollution level at a location to be estimated can be estimated simply and accurately.

However, the depth may not be used when the area is calculated. In addition, even in a case where the depth is used, the depth does not need to be calculated as described above, and information indicating the depth may be acquired using any method.

In addition, as in the above-described embodiment, the number of pieces of garbage in the image may be calculated and used to estimate the pollution level. According to such a configuration, it is possible to more accurately estimate a pollution level at a location to be estimated. However, the number of pieces of garbage does not have to be used to estimate the pollution level.

In addition, as in the above-described embodiment, a garbage portion, a non-garbage portion, and portions other than the location to be estimated may be detected through segmentation using machine learning. According to such a configuration, it is possible to reliably and appropriately estimate a pollution level at a location to be estimated. However, the garbage portion and non-garbage portion may be detected using methods other than those described above.

Figure 4:
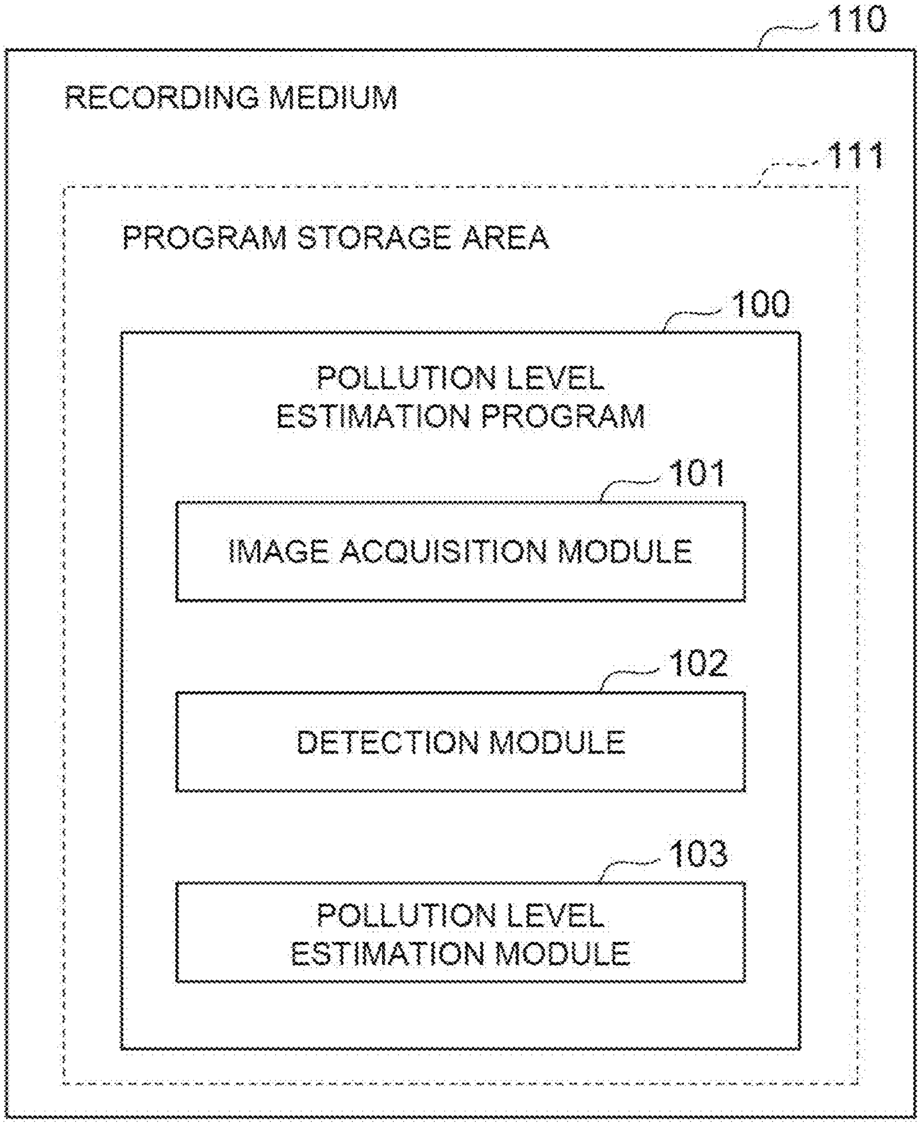
FIG. 4 is a diagram illustrating a configuration of a pollution level estimation program according to the embodiment of the present invention together with a recording medium.

Subsequently, a pollution level estimation program for executing the above-described series of processes performed by the pollution level estimation system 10 will be described. As shown in FIG. 4, a pollution level estimation program 100 is stored within a program storage area 111 formed in a computer-readable recording medium 110 which is inserted into and accessed by a computer or included in the computer. The recording medium 110 may be a non-transitory recording medium.

The pollution level estimation program 100 is configured to include an image acquisition module 101, a detection module 102, and a pollution level estimation module 103. The functions realized by executing the image acquisition module 101, the detection module 102, and the pollution level estimation module 103 are the same as the functions of the image acquisition unit 11, the detection unit 12, and the pollution level estimation unit 13 of the pollution level estimation system 10 described above, respectively.

Meanwhile, some or the entirety of the pollution level estimation program 100 may be configured to be transmitted through a transmission medium such as a communication line, received by another instrument, and recorded (including installation). In addition, each module of the pollution level estimation program 100 may be installed in any of a plurality of computers instead of one computer. In that case, the series of processes described above is performed by a computer system constituted by the plurality of computers.

The pollution level estimation system of the present disclosure has the following configurations.

[1] A pollution level estimation system configured to estimate a pollution level at a location to be estimated, the system comprising:

image acquisition means configured to acquire an image of the location to be estimated;

detection means configured to detect a garbage portion showing garbage and a non-garbage portion not showing garbage at the location to be estimated in the image acquired by the image acquisition means; and pollution level estimation means configured to calculate areas of the garbage portion and non-garbage portion detected by the detection means and estimate a pollution level at the location to be estimated on the basis of the calculated areas.

[2] The pollution level estimation system according to [1], wherein the pollution level estimation means acquires information indicating a distance from an imaging point to each of the garbage portion and non-garbage portion with respect to each of the garbage portion and non-garbage portion in the image and calculates the areas of the garbage portion and non-garbage portion weighted by the respective distances.

[3] The pollution level estimation system according to [2], wherein the pollution level estimation means calculates the distance from the image acquired by the image acquisition means.

[4] The pollution level estimation system according to any one of [1] to [3], wherein the pollution level estimation means calculates the number of pieces of garbage shown at the location to be estimated in the image and estimates a pollution level at the location to be estimated also on the basis of the calculated number of pieces of garbage.

[5] The pollution level estimation system according to any one of [1] to [4], wherein the detection means detects the garbage portion, the non-garbage portion, and portions other than the location to be estimated through segmentation using machine learning.

[6] A pollution level estimation method which is a method of operating a pollution level estimation system that estimates a pollution level at a location to be estimated, the method comprising:

an image acquisition step of acquiring an image of the location to be estimated;

a detection step of detecting a garbage portion showing garbage and a non-garbage portion not showing garbage at the location to be estimated in the image acquired in the image acquisition step; and a pollution level estimation step of calculating areas of the garbage portion and non-garbage portion detected in the detection step and estimating a pollution level at the location to be estimated on the basis of the calculated areas.

[7] A pollution level estimation program that causes a computer to operate as a pollution level estimation system that estimates a pollution level at a location to be estimated, the program causing the computer to function as:

image acquisition means configured to acquire an image of the location to be estimated;

detection means configured to detect a garbage portion showing garbage and a non-garbage portion not showing garbage at the location to be estimated in the image acquired by the image acquisition means; and pollution level estimation means configured to calculate areas of the garbage portion and non-garbage portion detected by the detection unit and estimate a pollution level at the location to be estimated on the basis of the calculated areas.

REFERENCE SIGNS LIST

10 Pollution level estimation system
11 Image acquisition unit

12 Detection unit
13 Pollution level estimation unit
100 Pollution level estimation program
101 Image acquisition module
102 Detection module
103 Pollution level estimation module
110 Recording medium
111 Program storage area

The invention claimed is:

1. A pollution level estimation system configured to estimate a pollution level at a location to be estimated, the system comprising circuitry configured to:

acquire an image of the location to be estimated;

detect a garbage portion showing garbage and a non-garbage portion not showing garbage at the location to be estimated in the acquired image;

acquire information indicating a respective distance from an imaging point to the portion reflected in each pixel of the garbage portion and to the portion reflected in each pixel of the non-garbage portion in the image; and calculate areas of the detected garbage portion and non-garbage portion weighted by the respective distances and estimate a pollution level at the location to be estimated on the basis of the calculated areas.

2. The pollution level estimation system according to claim 1, wherein the circuitry calculates the distance from the acquired image.

3. The pollution level estimation system according to claim 1, wherein the circuitry calculates the number of pieces of garbage shown at the location to be estimated in the image and estimates a pollution level at the location to be estimated also on the basis of the calculated number of pieces of garbage.

4. The pollution level estimation system according to claim 1, wherein the circuitry detects the garbage portion, the non-garbage portion, and portions other than the location to be estimated through segmentation using machine learning.

5. A pollution level estimation method which is a method of operating a pollution level estimation system that estimates a pollution level at a location to be estimated, the method comprising:

acquiring an image of the location to be estimated;

detecting a garbage portion showing garbage and a non-garbage portion not showing garbage at the location to be estimated in the acquired image;

acquiring information indicating a respective distance from an imaging point to the portion reflected in each pixel of the garbage portion and to the portion reflected in each pixel of the non-garbage portion in the image; and calculating areas of the detected garbage portion and non-garbage portion weighted by the respective distances and estimating a pollution level at the location to be estimated on the basis of the calculated areas.

6. A non-transitory computer-readable storage medium storing a pollution level estimation program that causes a computer to operate as a pollution level estimation system that estimates a pollution level at a location to be estimated, the program causing the computer to:

acquire an image of the location to be estimated;

detect a garbage portion showing garbage and a non-garbage portion not showing garbage at the location to be estimated in the acquired image;

acquire information indicating a respective distance from an imaging point to the portion reflected in each pixel of the garbage portion and to the portion reflected in each pixel of the non-garbage portion in the image; and calculate areas of the detected garbage portion and non-garbage portion weighted by the respective distances and estimate a pollution level at the location to be estimated on the basis of the calculated areas.

* * * * *